Figure 7:
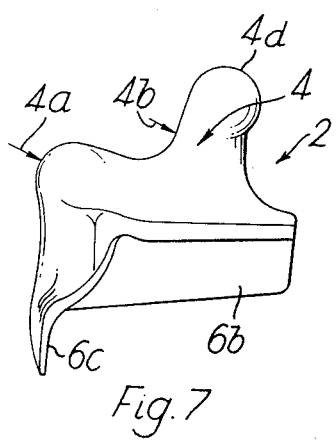
Figure 8:
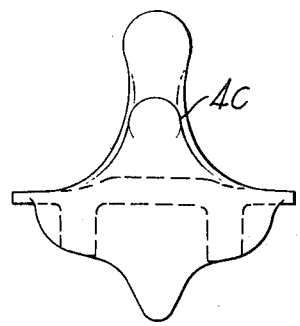
Figure 9:
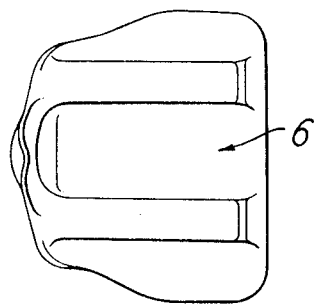
Figure 10:
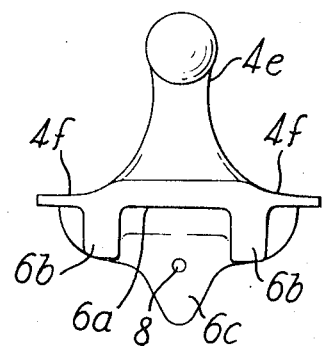

United States Patent [19]
Deane

[11] 3,840,905
[45] Oct. 15, 1974

[54] ENDOPROSTHETIC KNEE JOINT

[75] Inventor: Graham Deane, Chesterton, England

[73] Assignee: National Research Development Corporation, London, England

[22] Filed: Sept. 17, 1973

[21] Appl. No.: 397,928

[30] Foreign Application Priority Data
Sept. 18, 1972 Great Britain.................... 43151/72

[52] U.S. Cl..................................... 3/1, 128/92 C
[51] Int. Cl. ............................................... A61f 1/24
[58] Field of Search.............................. 3/1, 22–29; 128/92 C, 92 CA, 92 R

[56] References Cited
UNITED STATES PATENTS

| | | |
|---|---|---|
| 3,694,821 | 10/1972 | Moritz ........................................ 3/1 |
| 3,748,662 | 7/1973 | Helfet ......................................... 3/1 |
| 3,760,427 | 9/1973 | Schultz ....................................... 3/1 |
| 3,774,244 | 11/1973 | Walker ....................................... 3/1 |

Primary Examiner—Richard A. Gaudet
Assistant Examiner—Ronald L. Frinks
Attorney, Agent, or Firm—Cushman, Darby & Cushman

[57] ABSTRACT

An endoprosthetic knee joint device comprises femoral and tibial components having respective generally concave and convex bearing surfaces for mutual articulatory engagement, which surfaces are of similar saddle shapes including pommels at one pair of corresponding ends, and the longitudinal medial profiles of which shapes are mutually divergent. Preferably the lateral profiles of the saddle shapes are substantially complementary at their other ends remote from their pommels, but are progressively mutually divergent towards the one ends.

10 Claims, 10 Drawing Figures

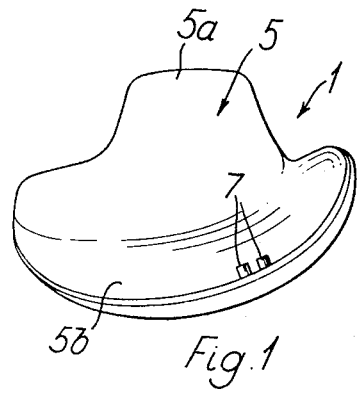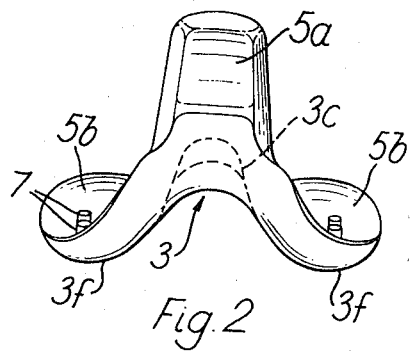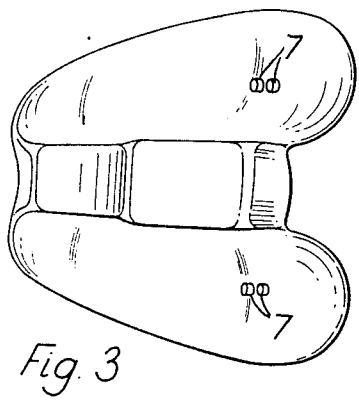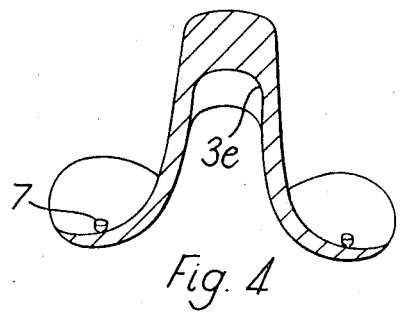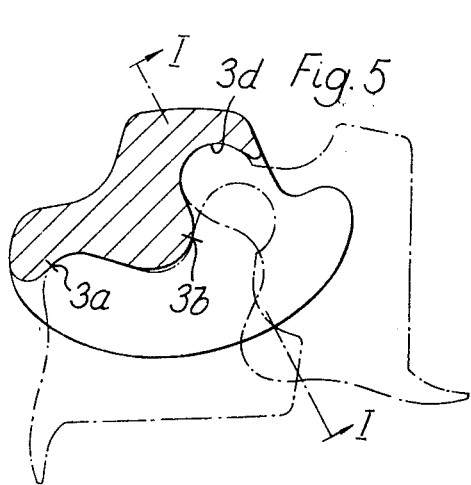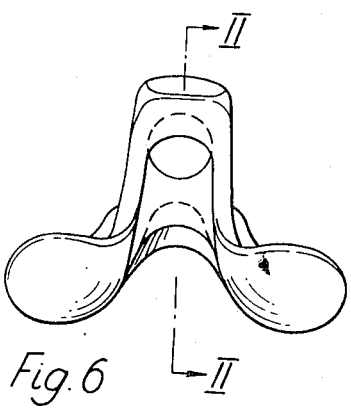

ENDOPROSTHETIC KNEE JOINT

This invention concerns prosthetic devices and more particularly endoprosthetic knee joint devices.

Existing forms of the latter devices are normally in the form of a mechanical hinge having a single axis of rotation and long intramedullary stems for purposes of fixation to the femur and tibia. While it is not denied that such devices have been beneficially employed in many applications, they suffer from various disadvantages. Among these disadvantages are the relatively restricted and unnatural movement afforded by the hinge compared to a natural joint, the need to remove the ligaments of the joint and significant amounts of bone in order to accommodate the device, and the need for relatively deep penetration of the medullary canals.

More recently there have been proposals for devices comprising separate femoral and tibial components which are held in bearing engagement by the natural joint capsule rather than by a pivot pin or some similar mechanical hinge linkage. While these later devices afford some improvement over the earlier hinged forms, the few which have so far come into use still suffer from some of the above disadvantages.

An object of the present invention is to provide a further improved endoprosthetic knee joint device of the more recent kind and, to this end, provides such a device comprising femoral and tibial components having respective generally concave and convex bearing surfaces for mutual articulatory engagement with the latter received in the former, which surfaces are of similar saddle shapes including pommels at one pair of corresponding ends, and the longitudinal medial profiles of which shapes are mutually divergent.

In use of such a device the longitudinal axial directions of the saddle shapes are disposed along the antero-posterior axis of the knee joint with the pommels located posteriorly. The more particular disposition of the components is such that the complementary surface portions thereof are in mutual bearing engagement to correspond to a position of zero flexion, and the pommel shapes come into such engagement with increasing flexion, this change in engagement being possible by virtue of the mutually divergent nature of the longitudinal profiles.

Advantage arises from the shaping of this device in that fixation can be simplified by a reduction in the need for removal of bone and deep penetration of the medullary canels. The more recent proposals for endoprosthetic devices have involved replacement of the femoral and tibial condyles by respective members having generally convex and concave bearing members. The present device on the other hand involves a reversal of this generalized geometry and allows the components to be located in and around the natural intercondylar notch of the femur and the intercondylar tubercles of the tibia with a reduced need for condylar bone removal. Also, advantage can be taken of the natural relief formation of these anatomical structures to employ gap-filling cement fixation without any need for significant medullary penetration.

Also advantage arises from the fact that the change of bearing engagement with flexion can involve a sliding and rolling between the relevant longitudinal profiles which closely simulates that of the natural knee joint, and this is discussed further hereinafter.

Preferably the saddle shapes are also such that their lateral profiles are substantially complementary at their other pair of corresponding ends remote from their pommels, but are progressively divergent towards said one pair of ends.

When components of this preferred form are engaged between their complementary ends, it will be appreciated that mutual rotational movement is inhibited other than that in the longitudinal direction. This singular rotational capability corresponds to that of a normal knee joint in zero flexion when rotation about the longitudinal axis of the leg is inhibited to facilitate stability in a standing stance. As this first disposition of the components changes with flexion, the longitudinal divergence of the bearing surface shapes is such that they slide to transfer the bearing engagement to one between the non-complementary end portions of the bearing surfaces, and the lateral divergence of the bearing surface shapes is such that the latter engagement occurs between the pommels. In this last situation the pommel surface portions are engaged in the manner of a ball-and-socket and can be subjected to relative rotation of the kind which was previously inhibited. In fact this additional rotational capability commences when the two components are in a disposition between those just discussed and increases towards full engagement of the pommel shapes, and this corresponds to the increasing rotational capabilities of the normal knee joint as full flexion is approached to facilitate flexibility of the leg in adopting various sitting and other non-standing stances and to reduce the torsional stresses which are associated with these stances.

Another feature of the preferred form of the present device, which is inter-related with that of affording a varying rotational capability simulating the normal knee joint, is that the bearing contact area between the two components will normally be significantly larger between the complementary bearing surface portions than between the pommel shapes. This is compatible with the respective correspondence of the relevant dispositions of the device to the positions of zero and increasing flexion in that the most frequent bearing load in the natural joint occurs during walking and involves a relatively small range of flexion from zero. Thus, the device provides greater bearing contact area when most frequently loaded. This is, of course, relevant to the question of wear in the device.

In order to further clarify the above and other features of the present invention, one embodiment of the same will now be described, by way of example, with reference to the accompanying drawings, in which:

FIGS. 1 to 6 schematically illustrate the femoral component of the embodiment in respective side, front, plan, lateral cross-sectional, longitudinal cross-sectional, and rear views, the first section being taken at I — I, and the second section being taken at II — II, and FIGS. 7 to 10 similarly illustrate the associated tibial component in respective side, front, inverted plan, and rear views.

The illustrated femoral and tibial components are denoted generally at 1 and 2 and provide respective bearing surfaces similarly denoted at 3 and 4. These surfaces are each of similar complex shaping having an overall form which it is thought can be best described verbally as that of a saddle including a pommel, with that of the femoral component being generally concave in that it is of an overall re-entrant form, while the other is of a converse, generally convex form.

The bearing surfaces 3 and 4 are closely similar in their corresponding end portions remote from their pommels to the extent of being substantially complementary in both longitudinal and lateral shaping. This relationship can be seen from one point of view in the drawings by comparison of the portion of the longitudinal medial profile between positions denoted 3a and 3b on the femoral bearing surface 3 as shown in FIG. 5 with the corresponding portion of the longitudinal medial profile between positions denoted 4a and 4b of the tibial bearing surface 4 as shown in FIG. 7. The relationship is similarly seen from another point of view by comparison of the nearer lateral profile portion 4c of the tibial bearing surface 4 as seen in the front view of FIG. 8 with the corresponding lateral profile portion 3c of the femoral bearing surface 3 denoted in broken line in FIG. 2.

However, this closer similarity between the bearing surfaces 3 and 4 decreases in that they progressively diverge towards the rear of the components relative to a mutual disposition in which the front ends of the components are engaged in complementary manner. This divergence can be seen by comparison of the longitudinal medial profile of the femoral bearing surface 3 in its transition from the position 3b to the pommel portion 3d as seen in FIG. 5 with the corresponding transition as seen in FIG. 7 from position 4b along the longitudinal medial profile of the tibial bearing surface 4 to its pommel 4d, the former transition being of greater curvature than the latter. The divergence can also be seen by comparison of the nearer lateral profile 4e of the tibial bearing surface as viewed from the rear in FIG. 10 with the corresponding profile 3e of the femoral bearing surface as seen in the section of FIG. 4, the latter being wider than the former except for the pommel portions.

The above comparison is facilitated in respect of the longitudinal profiles by a showing of the tibial component, in ghost line, in two positions in FIG. 5 which indicate the extreme positions of mutual articulation. In practice, these positions are such as to afford a capability for flexion up to about 110°.

As described in the introductory passages above, the geometry of the illustrated embodiment, as so far discussed, is such that the complementary portions of the bearing surfaces can be engaged to allow only a singular relative rotational movement in their common longitudinal direction, while providing a relatively large area of contact. As such rotational movement is increased there is a relative sliding movement between the bearing surfaces, and a lateral freedom is introduced to allow, in addition, relative rotation in the horizontal plane as the bearing engagement is transferred to one between the pommels. This last engagement is effectively that of a ball-and-socket joint subjected to the lateral restrictions imposed by the mutually opposed side faces of the two bearing surfaces.

This inter-action of the bearing surfaces is similar to that of the natural knee joint, and the bearing surfaces can be of a more particular shaping, such as illustrated, to closely simulate the more detailed functioning of the knee joint. For example, the movement of the knee joint in the vertical plane is composed almost wholly of sliding to define a varying centre of rotation. This action is simulated by the illustrated embodiment to define a locus for the centre of rotation which closely approximates to that which is typical for the knee joint. This is achieved in the illustrated embodiment by forming the intermediate portion of the longitudinal medial profile of the femoral bearing surface which has a single sense of curvature to a shape which is a reduction of a typical natural femoral condylar profile, and forming the corresponding tibial bearing surface profile to an appropriately developed shape.

It will be seen that the bearing surfaces terminate along their lateral peripheries in respective flared portions 3f and 4f which contribute to the bearing action in that their front ends are substantially complementary to enhance the distribution of bearing load referred to earlier in connection with the zero flexion disposition. Indeed, these flanged portions can, as in the illustrated embodiment, be shaped in functionally similar manner to the longitudinal medial profiles to remain in engagement at least on one side or the other throughout the range of flexion. However, the engagement towards the rear ends serves primarily to provide stability, rather than increased load bearing capability, with the flanges acting in the manner of out-riggers. This action does not impede the rotational capability in the horizontal plane.

Turning to the question of fixation, it will be seen that the non-bearing, upper surface 5 of the femoral component is a simplified form of its bearing surface 3 and has a ridged portion 5a rising from and extending between two flared peripheral portions 5b. As noted earlier, the ridged portion 5a is suited to fixation in the intercondylar notch of the femur. Little removal of bone is required to allow the desired positioning of the ridged portion 5a, and secure fixation can be effected by the use of gap-filling acrylic resin or equivalent medium. The generally stepped form of the ridged portion 5a in longitudinal profile is suited to such securement, although low relief formations can be applied to further enhance keying of the component with the cement, such as indicated by the showing of studs 7 in broken line in FIGS. 1 and 3. These studs extend upwardly from the posterior regions of the flared portions 5b and, in so far as the relevant component will normally be moulded or cast, any such formations should be compatible with removal from moulds or dies. In practice a suitable direction of separation from moulds is indicated by the section lines in FIGS. 5 and 6.

The flared portions 5b serve to facilitate attainment of the desired positioning and will be shaped to approximate to the shaping of the adjacent femoral condylar surface areas for this purpose. Accordingly, there is no necessity to remove bone from the areas immediately adjacent to the flared portions 5b, since the latter effectively locate the component relative to the former. Similarly, it is not necessary that the flared portions extend substantially across the condylar surfaces in a lateral sense. Lastly, regarding the flared portions 5b, they serve in association with the cement to further enhance the securement of the component.

The non-bearing, lower surface 6 of the tibial component is less similar to its bearing surface, there being a groove portion 6a which extends longitudinally below the main, upstanding body of the component. This groove portion is flanked and partly defined by two ridge portions 6b extending longitudinally below the flared portions 4f, and by a web portion 6c bridging the ridge portions 6b and extending therebelow. The groove portion 6a is suited to fixation around the intercondylar tubercles of the tibia, this notch being grooved along its sides to receive the rib portions 6b. Again, little bone removal is necessary and securement is effected by use of cement, possibly in association with the application of low relieved formations to enhance keying. The web portion 6c can be apertured, as indicated in broken line at 8, to allow flow of cement into a rivet-like formation which further enhances securement.

It will be noted that there need be no requirement for penetration, deep or otherwise, of the medullary canals for the purposes of securement.

The remaining matter which should be mentioned is that of materials. The devices can be made in the currently preferred manner with one component of plastics material, such as high density polyethylene, and the other of metal, such as appropriate chrome-cobalt alloy, to provide the low friction and other useful characteristics of such a combination. As to the allocation of these materials: it is preferred that the femoral and tibial components be respectively of plastics material and metal. The plastics material can be used to a relatively large thickness in the main bearing load region along the longitudinal medial portion of the former component as seen in FIG. 5 to take account of the greater susceptibility to wear of this material, while the metal provides the greater strength which can be regarded as appropriate to the necked region below the pommel of the tibial component.

I claim:

1. An endoprosthetic knee joint device comprising femoral and tibial components having respective generally concave and convex bearing surfaces for mutual articulatory engagement with the latter received in the former, which surfaces are of similar saddle shapes including pommels at one pair of corresponding ends, and the longitudinal medial profiles of which shapes are mutually divergent.

2. A device according to claim 1 wherein the lateral profiles of said saddle shapes are substantially complementary at their other pair of corresponding ends remote from said pommels, but are progressively mutually divergent towards said one pair of ends.

3. A device according to claim 1 wherein the intermediate portion of the longitudinal medial profile of said concave saddle shape extending between said one and other ends thereof corresponds to the same profile portion of a natural femoral condyle.

4. A device according to claim 1, wherein each of said saddle shapes is extending into flared portions along its longitudinal side peripheries.

5. A device according to claim 1 wherein the remaining exterior surface of said femoral component has a general shaping which is a simplified form of said saddle shaping.

6. A device according to claim 1 wherein the remaining exterior surface of said tibial component comprises two ridge portions and a groove therebetween extending longitudinally relative to the associated saddle shaping.

7. A device according to claim 6 wherein said tibial component remaining exterior surface further comprises a web bridging said ridge portions across said one end of said groove.

8. A device according to claim 7 wherein said web is apertured.

9. A device according to claim 1 wherein the remaining exterior surface of at least one of said components is formed with a low-relief structure.

10. A device according to claim 1 wherein said femoral and tibial components are respectively made of plastics material and metal.

* * * * *